Patented Nov. 9, 1943

2,333,873

UNITED STATES PATENT OFFICE 2,333,873

SALT TABLET CONTAINING A CALCIUM SALT AND PROCESS FOR MAKING THE SAME

Clair H. Martin, Park Ridge, Ill., assignor to Morton Salt Company, Chicago, Ill., a corporation of Illinois No Drawing. Application December 2, 1940, Serial No. 368,230

9 Claims. (Cl. 99—143)

This invention relates to an improvement in common salt tablets containing a small percentage of a calcium salt for use in canning tomatoes, and to a process for making the same.

It has been found that when tomatoes, particularly whole tomatoes, are treated with small quantities of a calcium salt in the process of canning them, the canned product is much improved. The addition of calcium salt causes the tomatoes to retain their original firmness during the heating process of canning. And this increase in firmness lessens the tendency of the tomatoes to break down by the shaking and agitation to which the canned material is normally subjected during handling and shipment. Thus the goods, when they reach the consumer, more nearly approximate the firmness of the natural product than where calcium salt is not added.

Though several calcium compounds may be effective for the purpose, calcium chloride has been tried heretofore as the most desirable, because of its high rate of solubility and because of its relatively low cost. Its hygroscopic character causes it to absorb moisture rapidly from the air to convert it into a brine.

Many obstacles are presented in the manufacture and combination of calcium chloride with common salt (NaCl) into tablets and in the use of such tablets in the canning industry:

In the first place, great difficulty is encountered in the preparation of a uniform mixture of the salt and calcium chloride. This is due to the difference in the physical character of the two materials. And when such mixture is obtained, the two materials tend to segregate when feeding the mixture from a hopper to the tablet-forming machine. Then, if carried on under ordinary atmospheric conditions, the manufacture of the mixture into tablets is attended by failure to completely fill the dies, arising from the moisture absorbed by the calcium chloride and the resulting uneven flow of the mixture. And the moisture in the mixture causes corrosion of the machine parts.

In the next place, salt tablets containing the calcium chloride cannot be used in the ordinary salt tablet dispenser, since therein they would be exposed to the atmosphere in the hopper before introduction into the cans, resulting in partial disintegration due to absorption of the moisture from the atmosphere. Thus they must be added to the cans by hand. There is also the difficulty and expense of packing them in airtight receptacles to keep out moisture. These and other factors make the use of salt tablets containing calcium chloride in canning very expensive, notwithstanding the relatively low cost of the calcium chloride itself.

The object of this invention is to provide a salt tablet containing a small amount of a salt of calcium and a process for its manufacture, which will substantially eliminate all the difficulties attendant upon the manufacture and use of salt tablets containing calcium chloride as above outlined, and which may be produced and used at a cost which is comparatively less than that involved in the use of calcium chloride.

The calcium salt used in the invention is calcium sulphate ($CaSO_4 \cdot 2H_2O$). This is practically insoluble in water; but, when used in tablet form combined with common salt in the process of canning tomatoes, it has a comparatively high rate of solubility in the concentrated brine formed about the salt tablet. In the process of the comparatively slow rate of solution of the tablet, a concentrated salt brine will be formed about the tablet to dissolve enough of the calcium sulphate before it reaches the boiler or other device in which the canned tomatoes are heat-treated, so that the tomatoes will be firmed up to withstand such heat-treatment. Thereafter a complete solution will further add to and increase the firmness of the tomatoes to withstand the shaking and agitation due to handling the cans.

Calcium sulphate being practically an insoluble calcium salt, would appear to be unfit for use in canning of tomatoes for the purpose desired. Its solubility is approximately 0.18 part in 100 parts of water. But it has been discovered that in saturated salt brine the solubility of calcium sulphate is about three times as high, namely, 0.54 part in 100 parts of water.

There is considerable difference in the rate of solubility of various market grades of calcium sulphate. A grade should be selected which has a solubility approximating that above stated.

Another factor which influences the rate of solubility is the size of the particles of the calcium sulphate. The smaller the size of the particle, the greater the rate of solubility, since there is more surface exposed to the solvent when the particles are of smaller size.

The process for making the combined common salt and calcium sulphate salt tablet is as follows:

Precipitated calcium sulphate having the chemical composition $CaSO_4 \cdot 2H_2O$ is first mixed with dry granulated salt in the ratio of 25 parts by weight of the calcium sulphate to 75 parts of salt. This operation may be successfully accomplished in a standard horizontal shaft mixer equipped with standard spiral ribbon type agitator and designed for center discharge.

The above mixture is then passed through a pulverizer in which it is reduced to a powder of about 200 mesh in fineness. The finely divided particles of the two materials are at the same time intimately and uniformly mixed together in the process of pulverizing. For this work a standard hammer mill will do the work satisfactorily. The pulverized material is again placed in the mixer, water is added and mixed until the material is uniformly damp. Water in the amount of about 7 or 8 percent (by weight) of the mixture gives the most satisfactory granulating operation. The above dampened mixture is then passed through a standard granulator which discharges the granulated material into shallow trays. These trays are then placed in a tray dryer and the material dried at a relatively low temperature.

The dried material is again passed through the same granulator using a finer screen and the material is ready to be compressed into tablets on a standard tablet machine. With reference to the screens used on the granulator it has been found satisfactory to use an 8 mesh piano wire screen for the wet granulation and a 12 mesh for the dry.

As specified above, the drying is carried on at a relatively low temperature as room temperature. A higher temperature as for example 86° F., may be used. But said higher temperature must be such that it will be insufficient in the time employed in the drying to reduce the water of crystallization in the calcium sulphate $CaSO_4 \cdot 2H_2O$, because calcium sulphate is more soluble in that form.

Tablets of the mixture may be produced under normal atmospheric conditions as the calcium sulphate is not hygroscopic. For the same reason no expensive moisture-proof packages are required. In addition, the tablets may be used in any regular tablet dispenser in the same manner as plain salt tablets. The method of manufacture above described insures absolute uniformity of composition.

The calcium sulphate of the tablet will also be acted upon by the acid in the tomato juice so as to increase its rate of solution above that which it would have in the salt brine alone.

When the uniform intimate mixture of the fine particles of powder of common salt and of calcium sulphate resulting from the treatment in the pulverizer, are dampened and treated in the granulator, the result is a mass of comparatively large wet granules. Each granule comprises an intimate, uniform mixture of the common salt particles and of the calcium sulphate particles in the predetermined proportions of the original mixture of the fine particles of powder. By the drying operation the particles of the two materials of the mix become bound together in the granule by the crystallization resulting from the drying.

In the second passage of the mixture through the granulator, the large dry granules are broken up into smaller, finer granules; but each of the finer granules, as in the case of the large ones, is of the same uniform structure and contains an intimate mix of the particles of the common salt and of the calcium salt distributed uniformly through the granule in accordance with the proportions used.

As a result of this structure, when a mass of the fine, dry granules are fed from a hopper to the tablet-making machine, there can be no segregation of the particles of calcium sulphate from the particles of common salt, since said particles are severally held in each granule by its crystalline form. Thus, when said fine granules are compressed together in the tablet-forming machine, the calcium sulphate particles will be maintained in uniform distribution throughout the tablet just as they are uniformly distributed throughout each of the granules. The final result is a compressed tablet containing an intimate mixture of finely divided particles of common salt and of calcium sulphate, with the particles of the calcium sulphate uniformly and evenly distributed through the tablet in accordance with the predetermined proportions of the two constituents of the mixture.

A compressed tablet of combined common salt and calcium sulphate thus constituted will dissolve in the liquor in the can of tomatoes to which it is added, at a rate to provide closely about the tablet an efficient, concentrated solvent for the particles of calcium sulphate as and when they are released by the dissolution of the salt particles, at the rate required to dissolve the calcium sulphate particles.

While in describing the invention I have referred to specific details as to proportions of amounts used in carrying on the process and to specific meshes of the wire screens used, it is to be understood that the invention is in no way limited thereto except as may be pointed out in the appended claims.

I claim as my invention:

1. The process of making a compressed tablet of a mixture of particles of common salt and of calcium sulphate consisting: in mixing with dry granulated salt, precipitated hydrous calcium sulphate in predetermined proportions; in reducing said mixture to a powder of finely divided particles with the particles of calcium sulphate uniformly distributed throughout the mixture; in then dampening the mixture and passing it through a granulator; in then drying the granulated material at a non-calcining temperature; in then passing the dried granules through a granulator adapted to reduce the size of said granules; and in thereafter compressing the granules into tablet form.

2. The process of making a compressed tablet of a uniform mixture of particles of common salt and of calcium sulphate consisting: in mixing dry common salt and hydrous calcium sulphate in predetermined proportions; in reducing said mixture to a powder of finely divided particles with the particles of the calcium sulphate uniformly distributed throughout the mixture; in then dampening the mixture and granulating it; it then drying the granulated material at a non-calcining temperature to form crystallized granules of the mixture; in then reducing the size of the dried granules of the mixture; and in thereafter compressing the granules into tablet form.

3. The process of making a compressed tablet of a uniform mixture of particles of common salt and of calcium sulphate consisting: in mixing dry common salt and hydrous calcium sulphate in predetermined proportions; in reducing said mixture to a powder of finely divided particles with the particles of the calcium sulphate uniformly distributed throughout the mixture; in then dampening the mixture and granulating it; in then drying the granulated material at a non-calcining temperature; and in thereafter compressing the granules into tablet form.

4. The process of making a compressed tablet of a mixture of common salt and calcium sulphate consisting: in mixing with dry granulated salt, precipitated hydrous calcium sulphate in the proportion of 25 parts by weight of the calcium sulphate to 75 parts of salt; in reducing said mixture to a powder of about 200 mesh fineness; in then mixing the pulverized material with water to dampen it uniformly; in then treating the damp mixture in a granulator; in then drying the granulated material at a non-calcining temperature; in then treating the dried granules in a granulator to reduce them in size; and in then compressing the fine granules into tablet form.

5. A compressed tablet consisting of a tomato-firming composition comprising a mixture of finely divided particles of common salt and of a small amount of hydrous calcium sulphate $$(CaSO_4 \cdot 2H_2O)$$

6. A compressed tablet consisting of a tomato-firming composition comprising a mixture of finely divided particles of common salt and of a small amount of hydrous calcium sulphate, said mixture being in the order of 25 parts of the calcium sulphate and 75 parts of common salt.

7. A compressed tablet consisting of a tomato-firming composition comprising an intimate mixture of finely divided particles of common salt and of hydrous calcium sulphate $(CaSO_4 \cdot 2H_2O)$ in predetermined proportions, said calcium sulphate being uniformly distributed through the tablet in accordance with said proportions.

8. A compressed tablet consisting of a tomato-firming composition comprising an intimate mixture of finely divided particles of common salt and of hydrous calcium sulphate $(CaSO_4 \cdot 2H_2O)$ in predetermined proportions, the particles of the calcium sulphate and salt being uniformly distributed through the tablet in crystalline form in accordance with the said proportions.

9. A compressed tablet consisting of a tomato-firming composition comprising an intimate mixture of finely divided particles of common salt and of hydrous calcium sulphate, the particles of said two materials being in the order of 25 parts of the calcium sulphate and 75 parts of common salt, the particles of the calcium sulphate being uniformly distributed through the tablet in accordance with the said proportions.

CLAIR H. MARTIN.